UNITED STATES PATENT OFFICE.

JOHN H. STEVENS, OF NEWARK, NEW JERSEY, ASSIGNOR TO THE CELLULOID COMPANY, OF SAME PLACE, A CORPORATION OF NEW JERSEY.

PYROXYLIN COMPOUND.

SPECIFICATION forming part of Letters Patent No. 566,349, dated August 25, 1896.

Application filed July 26, 1895. Serial No. 557,236. (No specimens.)

*To all whom it may concern:*

Be it known that I, JOHN H. STEVENS, a citizen of the United States, residing at the city of Newark, in the county of Essex and State of New Jersey, have invented certain new and useful Improvements in Pyroxylin Compounds, of which improvements the following is a specification.

This invention relates to the manufacture of pyroxylin compounds used in the arts, by which I mean those compounds which dry to a hard substance, either in the shape of thick masses used to imitate such materials as ivory, tortoise-shell, &c., or thin films, useful as sheets or protective coatings.

It is well understood that the stiffness and fluidity of the original mixtures depend upon the proportion of solvent used in the compound, and also that solvents are of two kinds, solids and liquids, which, though often used singly, are generally, for the best effects, employed in combination with each other.

As to the state of the art and the nature of these compounds, I refer to United States Letters Patent No. 517,987, of April 10, 1894, granted upon an application filed by me.

The distinctive novelty of the present invention consists in the employment, in combination with soluble pyroxylin, of a group of solid substances, each of which possesses the power, when heated, of dissolving nitrocellulose. I have also by a series of experiments ascertained that they not only possess the necessary solvent powers, but also form valuable combinations with pyroxylin, resulting in new compositions of matter possessing practical utility and new properties.

The importance of extending the list of solvent substances for use in these compounds is now generally recognized, as the variety of effects desired in manipulating the combinations, or in employing the final products, requires that the operator shall be possessed of a wide range of substances useful as ingredients.

The present group of solvents comprises certain crystalline pyrazolon derivatives, viz: antipyrin, or dimethylphenylpyrazolon, ($C_{11}H_{12}N_2O$,) tolypyrin, or tolyl, or methylphenyl dimethylpyrazolon, ($C_{12}H_{15}N_2O$) salipyrin, or antipyrin salicylate, ($C_{18}H_{17}N_2O_4$) and tolysal, or tolypyrin salicylate, ($C_{19}H_{20}N_2O_4$.) Any one of these substances, or any mixture of the same, can be combined with soluble pyroxylin and made to act as a converting agent when heated. A reference to their melting-points will indicate to the operator the wide range of plasticities or susceptibility to the molding operation at different temperatures made possible by the employment of these new solvents. Subject to variations due to impurities, &c., the melting-points of the different substances are about as follows: antipyrin, 110° to 113° centigrade; tolypyrin, 136° to 137° centigrade; salipyrin, 92° centigrade, and tolysal 101° to 102° centigrade.

In the course of my experiments to ascertain the best liquid menstrua to employ with these new solid solvents, I have found that grain-alcohol (ninety-five per cent. ethyllic alcohol) easily dissolves antipyrin and tolypyrin to form an active solvent in the cold, or at ordinary temperatures. Hence, where grain-alcohol is required as the liquid solvent, I recommend either antipyrin or tolypyrin.

The value of grain-alcohol is best exhibited in the stiffer mixtures, or those containing economical proportions of solvent. I prefer other liquid mentrua for the more fluid compounds.

With wood-spirit or wood-alcohol I employ tolypyrin, salipyrin, and tolysal by preference, although antipyrin forms a valuable compound solvent with wood-spirit.

I find acetone to be a very useful liquid menstruum for these new solid solvents. With acetone I prefer to use salipyrin and tolysal, because they are easily soluble in acetone. I have obtained excellent results by using acetone as the liquid menstruum in connection with pyroxylin and all of these new solid solvents. The usefulness of tolypyrin, however, is best exhibited when acetone is not the only liquid menstruum in the compound.

By using as a solid solvent a mixture of any two or more members of these new solid solvents the operator will find that they give superior results, and also that a mixture of wood-spirit and acetone forms a useful liquid menstruum to use in connection with them.

Solid solvents are seldom employed outside of the stiffer mixtures, because such mixtures generally depend for their valuable properties on their plasticity under heat, and their economical production in masses involves the employment of a small proportion of solvent to the pyroxylin. These new solid solvents may be substituted for camphor, but one of the most valuable features of their use is in connection with camphor. They possess the power of lowering the melting-point of the camphor and thus remove one of the annoying features of the processes in which camphor is employed as a solid solvent.

As to the proportions to be used, the operator can be guided by his experience with camphor and the liquid menstrua used in connection therewith. Useful proportions are about one part of camphor to two parts of pyroxylin, and this mixture may be moistened or rendered soft or of a dough-like consistency by the addition of about one or two parts of some liquid menstruum, like alcohol or wood-spirit, for instance.

The final dried compounds in most instances consist, practically, of the pyroxylin and solid solvent or solvents associated with pigment or coloring-matter. The stiff mixtures are generally manipulated in heated rolls, but another method is to use enough liquid solvent to make a compound which will flow or which can be applied to surfaces with a brush or by dipping and the evaporation of the liquid solvent leaves the solid material behind.

With the present group of solid solvents I have been enabled to employ either the rolling method or the liquid method of conversion with excellent results, and hence my invention is not confined to any particular method, its essential feature being the use of the new group of solid solvents in all of the well-known pyroxylin compounds belonging to the present class.

Other well-known liquid menstrua or solvents may be used in conjunction with my new group than those which I have mentioned in this specification. Their properties are so well understood as to require no further description.

These new solid solvents render the pyroxylin compounds made with them plastic under heat; that is, the solid compound, whether in the form of thick masses or thin films, left after the evaporation of the liquid solvent can be molded in hot dies.

The valuable feature of the present improvement is that the operator is enabled to produce hard compounds, which can be shaped, molded, or bent at comparatively low temperatures—for instance, in hot water. This molding operation, or exhibition of plasticity under heat, is mainly due to the solvent or softening action of my new solid solvents on pyroxylin. It is not necessary to entirely free the compound from liquid solvents in order to obtain this exhibition of the solvent power under heat. Similarly, the converting action in heated rolls is due to the solid solvent, assisted by the liquid menstrua employed. The influence of the solvents on the compound is also exerted regardless of the time or point in the mixing operation at which they are added. Thus the pyroxylin may be dissolved in sufficient liquid solvent, for instance, and the solid solvent then added, with no material difference in the result, though I recommend the preferred process of mixing.

Having thus described my invention, what I claim, and desire to secure by Letters Patent, is—

1. The process of manufacturing pyroxylin compounds which consists in combining pyroxylin with one or more of the hereinbefore-specified new group of solid solvents (antipyrin, tolypyrin, salipyrin and tolysal) and subject the mixture to heat sufficient to render the compound plastic, substantially as described.

2. The process of manufacturing solid or massive pyroxylin compounds which consists in mixing pyroxylin with one or more members of the hereinbefore-specified new group of solid solvents (antipyrin, tolypyrin, salipyrin and tolysal) and a liquid menstruum or liquid menstrua and subsequently subjecting the resulting compound to heat sufficient to render the compound plastic, substantially as described.

3. The process of manufacturing solid or massive pyroxylin compounds which consists in mixing pyroxylin with one or more members of the hereinbefore-specified new group of solid solvents (antipyrin, tolypyrin, salipyrin and tolysal), and one or more known solvents of pyroxylin, and subsequently subjecting the resulting compound to heat sufficient to render the compound plastic, substantially as described.

4. As a new composition of matter, a pyroxylin compound containing pyroxylin and one or more members of the hereinbefore-specified new group of solid solvents (antipyrin, tolypyrin, salipyrin and tolysal), substantially as described.

5. As a new composition of matter, a pyroxylin compound containing pyroxylin, one or more of the hereinbefore-specified new group of solid solvents (antipyrin, tolypyrin, salipyrin and tolysal), and a liquid menstruum or liquid menstrua, substantially as described.

6. As a new composition of matter, a pyroxylin compound containing pyroxylin, one or more members of the hereinbefore-specified new group of solid solvents (antipyrin, tolypyrin, salipyrin and tolysal), and one or more known solvents of pyroxylin, substantially as described.

7. A new compound of pyroxylin, containing pyroxylin, acetone, and one or both of the hereinbefore-specified substances to be used with acetone (viz., salipyrin and tolysal), substantially as described.

8. A new compound of pyroxylin, containing pyroxylin, wood-spirit and one or more of the hereinbefore-specified substances (antipyrin, tolypyrin, salipyrin and tolysal), substantially as described.

9. A new compound of pyroxylin, containing pyroxylin, wood-spirit, acetone and one or more of the hereinbefore-specified substances (antipyrin, tolypyrin, salipyrin and tolysal), substantially as described.

10. A new compound of pyroxylin, containing pyroxylin, camphor and one or more of the hereinbefore-specified substances (antipyrin, tolypyrin, salipyrin and tolysal), substantially as described.

In witness whereof I have hereunto signed my name this 24th day of July, 1895.

JOHN H. STEVENS.

In presence of—
ABRAHAM MANNERS,
GEO. E. STOUT.